Patented May 3, 1938

2,115,758

UNITED STATES PATENT OFFICE 2,115,758

SULPHONATED ALKOXY SUBSTITUTED ARYLIDES OF THE HIGHER FATTY ACIDS

Alfred William Baldwin, Blackley, Manchester, England, assignor to Imperial Chemical Industries Limited, a corporation of Great Britain No Drawing. Application November 2, 1935, Serial No. 47,979. In Great Britain November 12, 1934

7 Claims. (Cl. 260—124)

This invention relates to the manufacture of new wetting, cleansing and dispersing agents.

In British specification 343,524, there is described the production of wetting, cleansing and dispersing agents by sulphonating amides derived from aliphatic acids and primary aromatic amines free from nitro or auxochromic groups other than primary amino or sulphonic acid groups. Similarly, in British specification 341,053, there is described the production of wetting, cleansing and dispersing agents by sulphonating amides derived from aliphatic carboxylic acids and secondary aromatic bases not containing substituents on the aromatic nucleus other than sulphonic acid groups.

I have found, however, that the presence of an auxochrome group, namely alkoxyl, in the aromatic nucleus of those of the said amides derived from saturated aliphatic carboxylic acids is particularly advantageous in that nuclear sulphonation takes place more readily than is the case with the corresponding aromatic amides devoid of alkoxyl groups. Further, the nuclear sulphonic acids of the present invention are more readily soluble in water than are the nuclear sulphonic acids referred to in the above mentioned British specifications, a valuable property in products to be used in textile processes.

In the above mentioned specifications there is also described an alternative process for making the said wetting, cleansing and dispersing agents by acylation of primary or secondary aromatic sulphonic acids free from nitro or auxochromic groups with, for example, an aliphatic carboxylic acid chloride. I have found that the presence of the auxochromic group alkoxyl in the aromatic nucleus of arylamine m- or p-monosulphonic acids has particular advantages in the manufacture of such wetting, cleansing and dispersing agents. Thus, the alkoxy-arylamine-m- and p-sulphonic acids used in the present invention can be acylated more easily and completely to give higher yields of wetting, cleansing and dispersing agents having a higher degree of purity than is obtainable from the arylamine sulphonic acids of the above specifications. For example, when 4-amino-1-ethoxybenzene-2-sulphonic acid is reacted with oleic acid chloride oleylation proceeds to the extent of approximately 90-95% of the theoretical. On the other hand, by similar oleylation of sulphanilic or metanilic acids the yield is only about 50-60%. It is clear that in the latter cases the crude products are contaminated with fatty acid salts which, although acting as soaps in alkaline aqueous medium, reduce the cleansing and wetting efficiency of the crude mixture. The contaminating fatty acids are difficult to remove and even when this is done the purified products are inferior detergents to products of the same carbon chain length of the present invention.

According to the invention I make new wetting, cleansing and dispersing agents which are true monosulphonic acids by sulphonating alkoxy-arylamides derived from saturated aliphatic carboxylic acids containing not less than eight carbon atoms and primary or secondary amines of the benzene series carrying an alkoxy group on the aromatic nucleus, or alternatively, by acylating primary or secondary alkoxyarylamine-m- or p-monosulphonic acids of the benzene series with aliphatic carboxylic acids containing at least 8 carbon atoms, or the anhydrides or chlorides of the said carboxylic acids, which here may be saturated or unsaturated.

For the purpose of sulphonating the amides as hereinbefore defined, known sulphonating agents such as, for example, sulphuric acid monohydrate, 20% oleum, chloro-sulphonic acid or sulphuric acid in the presence of acetic anhydride are used. Sulphonation proceeds smoothly and readily to the monosulphonic acid stage. The introduction of a second sulphonic acid group presents great difficulty and the products of the present invention are essentially monosulphonic acids. In making the amides which are to be sulphonated, I may start from alkoxyarylamines such as, for example, p-phenetidine, o- or p-anisidine or their N-methyl- or ethyl derivatives and react these with, for example, lauric, myristic, palmitic, stearic or coconut oil fatty acids or their anhydrides or chlorides.

In the alternative process, involving the acylation of an alkoxyarylamine sulphonic acid, the acylation is preferably carried into effect by the use of a carboxylic acid chloride in an aqueous alkaline medium. As acylating agents I may use, for example, the acid chlorides of the above mentioned saturated fatty acids or the chlorides of unsaturated acids such as oleic, elaidic or erucic acids.

The products of the present invention are valuable wetting, cleansing, dispersing, emulsifying and softening agents. They dissolve readily in both soft water and water of 100% hardness to form clear, foaming solutions which are strongly resistant to hydrolysis by boiling alkalies or mineral acids.

The new products disperse lime soaps and show marked cleansing properties at temperatures ranging from 45–90° C. and for this reason are particularly suitable for the scouring of both wool and cotton goods.

The invention is illustrated but not limited by the following examples, in which the parts are by weight.

Example 1

20 parts of stearo-p-phenetidide (4-stearamido-1-ethoxybenzene; see E. de Conno, Chemisches Zentralblatt, 1918 (I), 1142) are stirred into 20 parts of acetic anhydride which is a convenient reaction medium. To this mixture 45 parts of sulphuric acid monohydrate are slowly added with stirring. The temperature is allowed to rise to 40–45° C. When a sample dissolves to give a clear solution in water, the mixture is run with stirring into enough dilute aqueous caustic soda solution to neutralize it. The new compound separates, as sodium salt. It is filtered off. The material in the form of the white filter-cake obtained is quite suitable for use as a dispersing or scouring agent but it may be dried and purified by crystallization from methyl alcohol. The product disperses lime soaps. It has marked cleansing properties at 80–90° C., but those cleansing properties are decreased at lower temperatures. For this reason it is particularly suitable for scouring cotton goods, a process usually carried out at 80–90° C.

The sulphonation described above may be carried out equally readily by adding the stearo-p-phenetidide crushed to the monohydrate.

Example 2

Instead of the 20 parts of stearo-p-phenetidide used in Example 1, there are used here 20 parts of stearo-p-anisidide. A similar product is obtained which, however, has excellent scouring properties in aqueous solution, not only at temperatures of 80–90° C., but also at lower temperatures. It is thus excellently suited for scouring wool. For example, a bath is prepared by dissolving 4 parts of the product in 1000 parts of water at 50° C. Dirty wool (up to 30 parts) is then worked in this bath at 50° C., and becomes excellently scoured. As the product has an excellent dispersing action on lime soaps, hard water may be used in the scouring bath.

Example 3

21.7 parts of p-phenetidine-2-sulphonic acid (4-amino-1-ethoxybenzene-2-sulphonic acid; Cohn, Liebig's Annalen, 1899, 309, 234), 50 parts of water and 25 parts of 32% aqueous caustic soda liquor are stirred together and 30 parts of the chloride of oleic acid are added during 15 minutes. The mixture is stirred during the addition, and the temperature is preferably kept below 15° C. either by suitable addition of ice or by internal cooling. Stirring is continued until a sample dissolves to a clear foaming solution in water.

By this means a jelly-like paste is obtained which after neutralization if the quantities of caustic soda and chloride of oleic acid have not been quite correctly apportioned, may be used as such as a scouring and dispersing agent. It dissolves readily in water. The solutions are quite stable towards hydrolysis by mineral acids, do not give precipitates with calcium chloride and exert a powerful dispersing action on lime soaps.

Example 4

30.2 parts of the chloride of stearic acid (prepared from technical stearic acid) and 12.5 parts of 32% caustic soda liquor are added simultaneously and slowly to a stirred solution consisting of 20.3 parts of p-anisidine-2-sulphonic acid (4-amino-1-methoxybenzene-2-sulphonic acid; Bauer, Ber., 42, 2110), 12.5 parts of caustic soda liquor and 50 parts of water, keeping the temperature of the reaction mixture below 15° by addition of ice or external cooling. After stirring for a further hour a product which is closely similar in properties with that of Example 2 is obtained.

Example 5

40 parts of dry lauro-p-anisidide (made by interacting the chloride of lauric acid with p-anisidine; crystallized from methyl alcohol M. P. 99–100° C.) are then added to 140 parts of sulphuric acid monohydrate and the viscous mass obtained is stirred at 60° until a sample dissolves to a clear foaming solution in cold water. The mass is then poured on to ice and the aqueous mixture obtained is neutralized by adding a sufficiency of aqueous caustic soda. A white paste is obtained. The product may be purified as described in Example 1. It is a powerful wetting agent.

If in the above example lauro-o-anisidide (2-lauramido-1-methoxybenzene; crystallized from methyl alcohol M. P. 67–68° C.) is used in place of lauro-p-anisidide, a product is obtained which is readily soluble in cold water to give clear, foaming solutions having powerful wetting-out action on wool and cotton.

Example 6

If instead of 43.6 parts of lauryl chloride used in Example 5 there is here used an equivalent proportion (calculated on the average molecular weight of the mixture) of the mixed acid chlorides derived from coconut oil acids and the product sulphonated as in Example 5, a powerful wetting agent is obtained.

Example 7

A product closely similar in properties to that obtained in Example 5 is obtained if instead of the 30.2 parts of stearyl chloride used in Example 4 there are used 21.8 parts of lauryl chloride.

Example 8

Stearo-o-anisidide (crystallized from methyl alcohol, colourless needles, M. P. 78–79° C.) made by interaction of the chloride of stearic acid with o-anisidine, is sulphonated and the product seperated as described in Example 1. The product is very similar in properties to that described in Example 4.

Example 9

20.3 parts of p-anisidine-2-sulphonic acid (4-amino-1-methoxybenzene-2-sulphonic acid) are interacted with 30 parts of oleic acid chloride exactly as described in Example 3 or 4. A very similar product is obtained.

Example 10

20.3 parts of o-anisidine-4-sulphonic acid (2-amino-1-methoxybenzene-4-sulphonic acid; Gnehm and Knecht; Journal fur praktische Chemie, 1906, (2), 74, 97) are treated with 30 parts of oleic acid chloride exactly as in Example 3. The product, an aqueous mixture, obtained in this case is not a clear gel, as obtained in Examples 3 and 9, but, possibly because the compound does not possess quite so high a solubility, is a thin, creamy paste. It is, however, readily and completely soluble in cold water at the concentrations used in scouring processes. The new compound is an excellent detergent and dispersing agent for lime soaps.

The new compositions covered in this case belong to the class of surface active or capillary active materials in that they have colloidal properties and may therefore be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, weighting salts such as magnesium sulphate or calcium chloride, oils and oils processed by oxidization, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry, these compositions function as useful wetting agents in soaking, deliming, bating, tanning, and dyeing baths. They are useful in softening and treating baths for hides and skins, particularly in baths used for fat-liquoring leather.

The dispersing and emulsifying powers of these new compositions give rise to many interesting uses. They may be utilized for converting liquid or solid substances normally insoluble in water, such as hydrocarbons, higher alcohols, other oxygen containing compounds, fats, oils, waxes, resins, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of salad oils and cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paint, varnish, and lacquer cleaners. They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used as anti-spattering agents for fats such as lard substitutes and butter substitutes. They may be used to stabilize rubber latex. They may also be used as frothing and collecting agents in ore flotation processes, and in other processes such as the recovery of fixed oil from the oil sands. The uses mentioned will suggest many similar ones.

As many apparently widely different embodiments of this invention may be made without widely departing from the spirit and scope thereof, it is to be understood that the invention is not limited to the specific embodiments thereof except as defined in the appended claims.

I claim:

1. A sodium salt of a sulphonated anisidide of oleic acid.

2. An alkali metal salt of a sulphonated anisidide of oleic acid.

3. A process of making an alkali metal salt of a sulphonated anisidide of oleic acid which comprises adding oleic acid chloride to an aqueous solution containing an anisidine sulphonic acid and an alkali metal hydroxide, and stirring the reaction mixture until a sample thereof dissolves to a clear foaming solution in water.

4. Sulphonated alkoxy substituted arylides of oleic acid wherein the sulphonic acid group is directly attached to the arylide radical, the arylide radical belongs to the benzene series and the alkoxy group contains not more than two carbon atoms.

5. A member of the group consisting of sulphonated anisidides and phenetidides of oleic acid wherein the sulphonic acid group is directly attached to the aromatic radical.

6. A process for making a member of the group consisting of sulphonated anisidides and phenetidides of oleic acid which comprises oleylating a member of the group consisting of anisidine and phenetidine sulphonic acids with oleic acid chloride in an aqueous alkaline medium.

7. A process for the manufacture of wetting, cleansing and dispersing agents which comprises oleylating alkoxy arylamine monosulphonic acids of the benzene series which contain no more than two carbon atoms in the alkoxy group with oleic acid chloride in an aqueous alkaline medium.

ALFRED WILLIAM BALDWIN.